United States Patent [19]

Gardner, Sr.

[11] Patent Number: 5,294,246
[45] Date of Patent: Mar. 15, 1994

[54] EMISSION SUPPRESSION SYSTEM FOR STORED VOLATILE ORGANIC COMPOUNDS

[75] Inventor: Gary L. Gardner, Sr., Lake Jackson, Tex.

[73] Assignee: The Dow Chemical Company, Midland, Mich.

[21] Appl. No.: 994,391

[22] Filed: Dec. 21, 1992

[51] Int. Cl.$^5$ ............................................. B01D 53/04
[52] U.S. Cl. ............................................. 95/15; 95/21; 95/23; 95/97; 95/104; 95/146; 95/143
[58] Field of Search ................... 55/25, 26, 58, 62, 68, 55/74, 88

[56] References Cited

U.S. PATENT DOCUMENTS

| | | | |
|---|---|---|---|
| 1,439,451 | 12/1922 | Seibert et al. | 55/58 |
| 1,566,944 | 12/1925 | Wilson . | |
| 2,390,536 | 12/1945 | Houdry et al. | 55/58 |
| 3,867,111 | 2/1975 | Knowles | 55/21 |
| 4,104,039 | 8/1978 | Kuri et al. | 55/58 X |
| 4,305,734 | 12/1981 | McGill | 55/62 X |
| 4,331,456 | 5/1982 | Schwartz et al. | 55/58 X |
| 4,338,101 | 7/1982 | Tuttle | 55/58 X |
| 4,343,629 | 8/1982 | Dinsmore et al. | 55/58 X |
| 4,421,532 | 12/1983 | Sacchetti et al. | 55/58 X |
| 4,436,534 | 3/1984 | Seguy | 55/58 |
| 4,462,811 | 7/1984 | Dinsmore et al. | 55/58 X |
| 4,829,968 | 5/1989 | Onufer | 123/518 |
| 4,846,852 | 7/1989 | Schweitzer et al. | 55/62 X |
| 4,859,216 | 8/1989 | Fritsch | 55/62 X |
| 4,886,096 | 12/1989 | Reddy | 141/45 |
| 4,966,611 | 10/1990 | Schumacher et al. | 55/62 X |
| 5,021,071 | 6/1991 | Reddy | 55/58 |
| 5,154,735 | 10/1992 | Dinsmore et al. | 55/58 X |

OTHER PUBLICATIONS

King, M., "Technologies for Controlling the Emission of Volatile Organic Compounds to the Atmosphere", TransIChemE, vol. 68, Part B. Aug. 1990.

Primary Examiner—Robert Spitzer

[57] ABSTRACT

A method of controlling the emission of volatile organic compound vapors from storage vessels via pressure swing absorption utilizing a single adsorber vessel is disclosed.

6 Claims, 1 Drawing Sheet

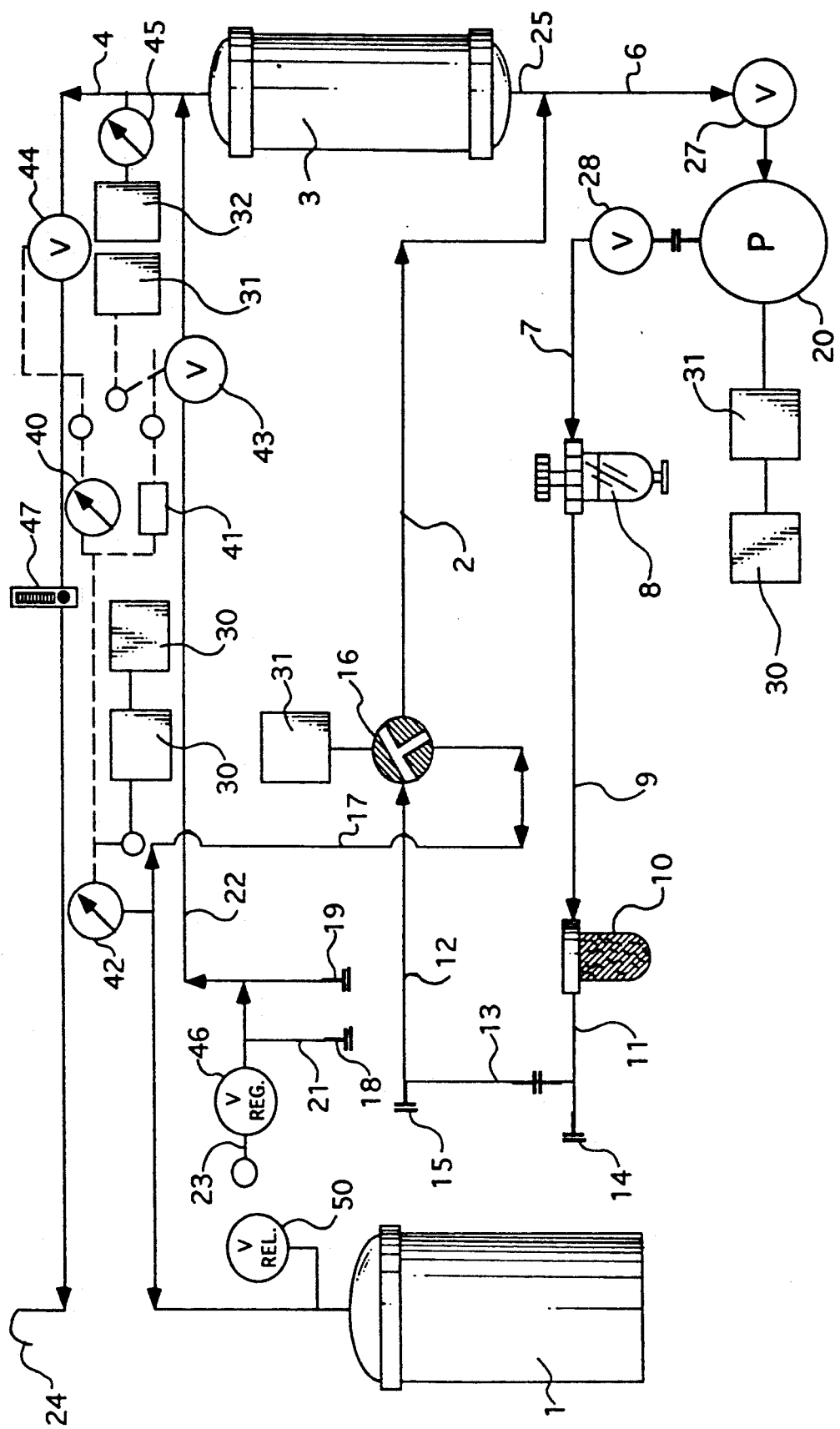

EMISSION SUPPRESSION SYSTEM FOR STORED VOLATILE ORGANIC COMPOUNDS

BACKGROUND OF THE INVENTION

The present invention is related to methods for preventing volatile organic compounds (VOC) emissions from storage vessels and maintaining acceptable pressure within such vessels.

Volatile organic compounds (VOCS) are generally stored at ambient pressure and temperature in low pressure storage tanks. The VOCs coexist in the liquid and vapor phases in the tanks. The tanks experience depressurization/pressurization due to filling and draining of the tanks as well as due to changes in external temperature and, to a lesser degree, changes in pressure. To avoid tank rupture due to pressure increases within the tanks, it is necessary to vent vapors when the pressure rises. Since these vapors include VOCs, they typically cannot be vented to the atmosphere due to environmental concerns. To avoid tank collapse due to pressure decreases within the tanks, it is necessary to replenish vapors when the pressure falls. This is done by adding an inert or uncondensible gas such as nitrogen or air as a blanket gas. The blanket gas is also sometimes called a pad gas.

Various methods have been developed to remove VOCs prior to the remainder of the vapor containing the blanket gas being vented to the atmosphere. The principle technologies commercially available for reducing VOC emissions are:

(1) granular activated carbon adsorption plants;
(2) carbon cloth adsorption plants;
(3) molecular sieve adsorbents;
(4) thermal oxidation/incineration;
(5) catalytic decomposition; and
(6) compression/refrigeration systems.

These technologies either destroy the VOCs, generating a waste that must be disposed of, or recover the VOCs in liquid form that must be handled to be recycled. There remains a need for a process for controlling vapor phase emissions of VOCs that is efficient and economical.

SUMMARY OF THE INVENTION

The present invention is an improved method for substantially eliminating undesired vapor emissions of VOCs while maintaining the pressure within a storage vessel. Typically the storage vessel is a stationary storage tank. During thermal expansion of the vapor space in the tank or other vessel or displacement of the tank vapor due to filling, sufficient vapor to maintain the desired pressure in the vessel is removed from the storage vessel and channeled to a single adsorber vessel. The VOC vapors are there adsorbed on an adsorbent such as granulated activated carbon and the inert gas is vented to the atmosphere. The adsorbed vapors are desorbed from the adsorbent by purging the adsorber vessel with a fresh supply of inert gas while applying a vacuum. The vacuum pump discharge containing the desorbed VOCs and inert gas is returned to the vapor space in the storage vessel to offset a depressurization due to, for example, removal of liquid VOCs from the storage vessel or lower external temperatures.

The process of the present invention comprises a method of substantially eliminating VOC emissions to the atmosphere from a storage tank and controlling pressure within the tank, the method comprising providing a single adsorber with a selectively openable and closable vent to the atmosphere (adsorber vent) and filled with an adsorbent that adsorbs VOCs and from which said VOCs are desorbed by applying vacuum and purging with inert gas;

providing a selectively openable and closable first line between the tank and the adsorber;

opening the first line in response to a pressure rise within the tank thereby directing said vapor containing the VOCs to the adsorber wherein the VOCs are adsorbed;

opening the adsorber vent proportionally to a pressure rise within the storage tank thereby directing vapor essentially free of VOCs to the atmosphere;

providing a source of selectively applicable vacuum;

providing a source of selectively applicable inert gas;

providing a selectively openable and closable second line between the inert gas source and the adsorber;

providing a selectively openable and closable third line between the vacuum source and the adsorber;

providing a selectively openable and closable fourth line between the vacuum source and the storage vessel's vapor space;

opening the second, third, and fourth lines in response to a pressure drop within the storage vessel below a predetermined pressure thereby directing the inert gas through the adsorber at a vacuum thus desorbing the VOCs, said VOCs and inert gas being directed to the storage tank's vapor space through the third and fourth lines; and providing a means for the automatic control and monitoring of the system comprising means to start and stop the vacuum source, to open and close the lines, and to monitor the pressure, temperature and flow.

The process of the present invention is an improvement over existing methods in that it uses a single adsorber vessel; avoids the need to condense the solvent and handle liquid solvent; doesn't require cooling and heating mediums; saves VOCs and prevents it from becoming an emission, waste or waste byproduct; and uses a vacuum pump intermittently rather than continuously.

BRIEF DESCRIPTION OF THE DRAWINGS

The single drawing is a schematic outline of the process.

DETAILED DESCRIPTION OF THE ILLUSTRATION EMBODIMENTS

The present invention is useful in substantially preventing VOC emissions from low pressure storage vessels while maintaining the internal pressure of the storage vessels within predetermined limits. These vessels can be storage tanks to store any VOC such as fuels, solvents, hydrocarbons and chlorinated hydrocarbons. Non-limiting examples include gasoline, acetone, carbon tetrachloride, and trichloroethylene.

The adsorbent used in the adsorber vessel is any that will adsorb the VOCs at ambient temperature and pressure. In a preferred embodiment, activated carbon is used although other adsorbents such as molecular sieves, synthetic organic resins, silica gel, activated alumina, fuller's earth and other clays are suitable. The size of the adsorber vessel and amount of adsorbent used are selected based on the volume of the storage vessel and the manner in which it is used so that the adsorber vessel has the capacity to adsorb the largest amount of VOC vapors that would be vented from the storage vessel in a set time period.

In the adsorbing mode, substantially all of the VOC vapors are adsorbed and therefore not vented to the atmosphere. By substantially all, it is meant that at least about 98 percent of the incoming VOC is adsorbed. As will be recognized by those skilled in the art, the efficiency with which the VOC vapors are adsorbed is a function of design and other factors such as economics. Generally, a balance will be struck between the amount of VOC vapor desired to be removed and the cost of such removal. Preferably, this amount is 99 percent, 99.9 percent, 99.99 percent or greater.

In the desorbing mode, the vacuum source is any that will provide a vacuum of about 24 to 28 inches of mercury. Suitable vacuum sources include vacuum pumps and eductors using the liquid VOCs as the motive fluid. The desorption is conducted at any appropriate temperature. It is preferred that the desorption step is conducted at ambient temperatures in the absence of external heating or cooling.

The selectively openable and closable lines and vents used in the present invention will typically be opened and closed by means of any of the various types of commercially available automated valves.

The manner in which the various valves and pumps are activated is not critical to the practice of the present invention. In a preferred embodiment, the system is computer controlled with a commercially available process control computer. Various elements of the controls can be electronic, pneumatic, hydraulic, electrical, electromechanical, mechanical, and various combinations thereof. The process is preferably controlled so that once activating pressures are determined based on the design of the storage tank, the VOC that is stored, and other conditions, the process is fully automated.

In a preferred embodiment, solvent vapors are recovered from a stream of solvent vapors in nitrogen vented from a storage tank due to vapor expansion in the tank or displacement during filling. A pressure rise, above a predetermined point, causes a valve(s) to open proportionally to the pressure difference between the tank and the set point. This allows the pressure in the storage tank to be maintained within a set range. When the pressure in the tank decreases to a preset point, the necessary valve(s) are closed. The vented vapors are transferred to a single adsorber where the solvent vapors are adsorbed and excess nitrogen or other inert gas is vented to the atmosphere. A pressure decrease below a predetermined point in the storage tank causes the vacuum pump to be activated pulling a vacuum on the adsorber by means of a nitrogen back-purge, desorbing the solvent vapors. Appropriate valves are opened returning this vapor to the vapor space in the storage tank to increase the pressure in the tank. When the pressure rises to the desired level, the pump is turned off and the valving is changed as appropriate.

The invention is best described with reference to the single Figure. VOC vapors are recovered from a stream of VOC vapors in nitrogen vented from a storage tank 1 due to vapor thermal expansion in the storage tank or displacement due to filling. A pressure rise, above a predetermined pressure, is sensed by a vent pressure indicator/controller (PIC) 40, which receives a pressure signal from a pressure transmitter 42, which is sensing the pressure in the vent line 17 to/from the storage tank 1. A computer is used to control certain events of the system such as cycle times, the vacuum pump operation, various valves opening and closing, and alarming based on inputs to the computer. The interface with the computer is shown as digital inputs to the computer 30, digital outputs from the computer 31, and analog inputs to the computer 32.

In this adsorption/venting mode, the computer is programmed to maintain the three-way valve 16 in the correct position to communicate the vapor line 17 to/from the storage tank 1 to the adsorber vessel 3 inlet 25 in the adsorption mode via the adsorption inlet line 2. In this adsorption/venting mode, the vacuum pump 20 is maintained in shut-down status by the computer program and the three-way valve 16 prevents the vacuum pump 20 discharge line 12 from communicating with either the vapor line 17 to/from the storage tank 1 or the adsorption inlet line 2. The vent PIC 40 controls the vent control valve 44 and causes it to open proportionally to the positive difference between the storage tank 1 pressure minus the vent PIC 40 set point pressure. This allows the pressure in the storage tank 1 to be maintained within a predetermined range. When the pressure in the storage tank 1 decreases back down to the set point of the vent PIC 40, vent PIC 40 closes the vent control valve 44. The gas stream from the storage tank 1 containing VOCs in the gas stream is thus passed through the single adsorber 3 where the VOCs are adsorbed on the contained adsorbent, which in this case is granulated activated carbon. Most of the nitrogen is vented to the atmosphere at the vent stack 24 after passing through a flow meter 47 in the vent line 4 from the adsorber 3.

The VOC vapors are desorbed into a stream of nitrogen that is used to replace vapors in said storage tank 1 due to vapor thermal contraction or to replace the vapor due to draining of the storage tank 1. A pressure drop to a predetermined desorption pressure causes the computer to go into the desorption mode in which the vent control valve 44 remains closed, the three-way valve 16 is switched so that the vacuum pump discharge line 12 communicates with the vapor line 17 but not with the adsorption inlet line 2, and the vacuum pump 20 is operating. A pressure drop, below the predetermined desorption pressure, is sensed by a pad PIC 41, which receives a pressure signal from said pressure transmitter 42, which is sensing the pressure in the vapor line 17. The pad PIC 41 controls the pad nitrogen control valve 43, located in the low pressure nitrogen supply line 22 which is down stream of the high pressure nitrogen supply line 23 and the nitrogen high pressure let-down pressure regulator 46, causing it to open proportionally to the positive difference between the pad PIC 41 set point pressure minus the storage tank 1 pressure as measured by the pressure transmitter 42 in the vapor line 17. Thus after an adsorption/venting cycle or after a period of system stand-by, as the storage tank 1 pressure decreases the first event is the vacuum pump 20 coming on and the three-way valve 16 operates to the desorption mode position. Then as the pressure further decreases the pad PIC 41 starts purging the adsorber 3 with nitrogen. The reduced pressure and VOC free back-purge creates a driving force to desorb the volatile organic compound off of the activated carbon and come back out of the adsorber 3 with the nitrogen. The vacuum pump 20 pumps this adsorption stream back up to and slightly higher than the storage tank 1 pressure. This desorption stream is conducted from the adsorber 3 to the vacuum pump 20 via piping 6 containing a manual block valve 27 provided for vacuum pump 20 isolation during maintenance operations. From the discharge of the vacuum pump 20, said desorption stream flows into the discharge line 7 containing a manual block valve 28 provided for vacuum pump 20 isolation during maintenance operations. Said desorption stream then flows through an oil coalescer 8, additional piping 9, an oil mist filter 10, additional piping 11, 12 and 13 then through the three-way valve 16 which conducts the flow to the vapor line 17.

This desorption stream serves the dual purposes of maintaining the storage tank 1 pressure above a predetermined minimum pressure and back-flushing the adsorber vessel 3 to desorb the VOC off the adsorbent and return it back in the vapor phase to the storage tank 1 from which it came. After the storage tank 1 pressure is padded back up to the desorption pressure, the pad PIC 41 will have closed the pad nitrogen control valve 43. At this point in the desorption cycle, the computer is programmed to keep the vacuum pump 20 operating and the three-way valve 16 in the desorption position unless the pressure in the storage tank 1 rises to a predetermined increment above the desorption pressure or if the storage tank 1 has remained above the desorption pressure for a predetermined amount of time, at which time the computer will turn off the vacuum pump 20, open the pad nitrogen control valve 43 independent of the pad PIC 41 to break the vacuum in the adsorber vessel 3, close the pad nitrogen control valve 43 when the pressure in the adsorber vessel 3 is between the desorb pressure plus the said increment and the set point pressure of the vent PIC 40 as determined by the pressure transmitter 45 located on the exit line 4 of the adsorber vessel 3.

At this point the three-way valve 16 is operated to put it in the adsorption or venting mode. In this condition, the system is in a standby mode and can go into the adsorption/venting mode or the desorption/padding mode depending on the storage tank 1 pressure rising or falling higher or lower than the predetermined pressure limits in the computer program. As long as the storage tank 1 pressure is lower than the vent PIC 40 set point pressure and higher than said desorption pressure, both of which are predetermined based on the design pressure of the storage tank 1 and the relief device 50 set pressure of the storage tank 1, the system will remain in a standby mode and neither adsorb/vent or desorb/pad. In this preferred embodiment, the vent PIC 40 set point pressure is set as high as possible and the said desorption pressure is set as low as possible to prevent venting or purging unless absolutely necessary, thus saving nitrogen.

In some embodiments, a heat exchanger is added to the system and connected to flanges 18, 19, 14 and 15 provided in the vacuum pump 20 discharge lines 11 and 12 and the low pressure nitrogen lines 21 and 22. Valves, flanges, and line blinds may be added to direct the flows as desired so that the heat of compression in the vacuum pump 20 discharge stream is absorbed by the low pressure nitrogen back-purge stream so that the adsorbent bed is heated up to facilitate desorption.

What is claimed is:

1. A method of preventing volative organic compound (VOC) emissions from a storage vessel, such method comprising provided a single adsorber with a selectively openable and closable vent to the atmosphere (adsorber vent) and filled with an adsorbent that adsorbs VOCs and from which said VOCs are desorbed by applying vacuum and purging with inert gas;

providing a selectively openable and closable first line between the storage vessel and the adsorber;

opening the first line in response to a pressure rise within the storage vessel thereby directing a vapor containing VOCs to the adsorber wherein the VOCs are adsorbed;

opening the adsorber vent proportionally to a pressure rise within the storage vessel thereby directing vapor essentially free of VOCs to the atmosphere;

providing a source of selectively applicable vacuum;

providing a source of selectively applicable inert gas;

providing a selectively openable and closable second line between the inert gas source and the adsorber;

providing a selectively openable and closable third line between the vacuum source and the adsorber;

providing a selectively openable and closable fourth line between the vacuum source and the storage vessel's vapor space;

opening the second, third, and fourth lines in response to a pressure drop within the storage vessel below a predetermined pressure thereby directing the inert gas through the adsorber at a vacuum thus desorbing the VOC, said VOC and inert gas being directed to the storage vessel's vapor space through the third and fourth lines; and providing a means for automatic control and monitoring of the method comprising means to start and stop the vacuum source, the open and close the first, second, third, and fourth lines, and to monitor the pressure, temperature and flow.

2. The method of claim 1 wherein the adsorbent is activated carbon.

3. The method of claim 1 wherein the desorption is conducted in the absence of external heating or cooling.

4. The method of claim 1 wherein the desorption is conducted with a heat exchanger exchanging the heat in the fourth line with the inert gas in the second line thus heating the inert gas prior to entering the adsorber for desorption purposes.

5. The method of claim 1 wherein the desorption is conducted with the aid of external heating.

6. The method of claim 1 wherein less than two percent of the VOCs contained in the vapor directed to the adsorber is vented to the atmosphere.

* * * * *